US009363762B2

(12) United States Patent
Luo et al.

(10) Patent No.: US 9,363,762 B2
(45) Date of Patent: Jun. 7, 2016

(54) METHOD AND DEVICE FOR DETERMINING TRANSMISSION POWER (71) Applicant: Huawei Technologies Co., Ltd., Shenzhen, Guangdong (CN)

(72) Inventors: Haiyan Luo, Shenzhen (CN); Tianle Deng, Shenzhen (CN); Binsong Tang, Shenzhen (CN); Yanzan Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/491,631

(22) Filed: Sep. 19, 2014

(65) Prior Publication Data
US 2015/0011167 A1 Jan. 8, 2015

Related U.S. Application Data

(63) Continuation of application No. PCT/CN2013/073012, filed on Mar. 21, 2013.

(30) Foreign Application Priority Data

Mar. 21, 2012 (CN) .......................... 2012 1 0076286

(51) Int. Cl.
*H04B 17/00* (2015.01)
*H04B 1/00* (2006.01)
(Continued)

(52) U.S. Cl.
CPC ............ *H04W 52/143* (2013.01); *H04W 24/08* (2013.01); *H04W 28/20* (2013.01); *H04W 52/244* (2013.01); *H04W 52/343* (2013.01)

(58) Field of Classification Search
CPC ....................................................... H04B 7/00

USPC ......................................... 455/522, 69, 127.1
See application file for complete search history.

(56) References Cited

U.S. PATENT DOCUMENTS 8,219,094 B2 * 7/2012 Huber ................ G06Q 20/1235
455/436
8,446,872 B2 * 5/2013 Choi ..................... H04L 5/0062
370/330

(Continued)

FOREIGN PATENT DOCUMENTS

CN 101932022 A 12/2010
CN 102006599 A 4/2011
(Continued)

OTHER PUBLICATIONS

"$3^{rd}$ Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.5.0, pp. 1-302, $3^{rd}$ Generation Partnership Project, Valbonne, France (Mar. 2012).

(Continued)

*Primary Examiner* — Tilahun B Gesesse
(74) *Attorney, Agent, or Firm* — Leydig, Voit & Mayer, Ltd.

(57) ABSTRACT

The present invention provides methods and devices for determining a transmission power and relates to the field of communication technologies. A method includes receiving, by a power determining device, capacity information of a first cell sent by a serving base station of the first cell and determining a transmission power used by a serving base station of the second cell on the specific resource of the second cell according to the capacity information of the first cell. The aforementioned method allows the capacity of the first cell to be guaranteed.

12 Claims, 3 Drawing Sheets

(51) Int. Cl.
*H04B 7/00* (2006.01)
*H04W 52/14* (2009.01)
*H04W 52/24* (2009.01)
*H04W 24/08* (2009.01)
*H04W 28/20* (2009.01)
*H04W 52/34* (2009.01)

(56) References Cited

U.S. PATENT DOCUMENTS

| | | | | |
|---|---|---|---|---|
| 8,504,032 | B2* | 8/2013 | Lott | G06Q 30/016 455/230 |
| 8,774,792 | B2* | 7/2014 | Deng | H04W 24/10 370/338 |
| 8,774,801 | B2* | 7/2014 | Ore | H04W 12/08 370/338 |
| 9,084,202 | B2* | 7/2015 | Hamabe | H04W 52/242 |
| 9,084,271 | B2* | 7/2015 | Jo | H04W 72/085 |
| 9,107,136 | B2* | 8/2015 | Whinnett | H04W 36/30 |
| 9,125,099 | B2* | 9/2015 | Pokhariyal | H04W 24/00 |
| 9,137,806 | B2* | 9/2015 | Yavuz | H04W 72/082 |
| 9,167,538 | B2* | 10/2015 | Guillet | H04W 52/243 |
| 9,179,417 | B2* | 11/2015 | Wang | H04W 52/367 |
| 9,210,633 | B2* | 12/2015 | Marinier | H04W 36/20 |
| 2009/0042593 | A1* | 2/2009 | Yavuz | H04W 52/40 455/522 |
| 2011/0098055 | A1* | 4/2011 | Kwon | H04W 52/08 455/452.2 |
| 2012/0088491 | A1* | 4/2012 | Deng | H04W 24/02 455/418 |

FOREIGN PATENT DOCUMENTS

| | | |
|---|---|---|
| CN | 102300306 A | 12/2011 |
| CN | 102378243 A | 3/2012 |
| EP | 0856955 A2 | 8/1999 |
| JP | H11150754 A | 6/1996 |
| JP | 2008295045 A | 12/2008 |
| JP | 2010536309 A | 11/2010 |

OTHER PUBLICATIONS

"3rd Generation Partnership Project; Technical Specification Group Radio Access Network; Evolved Universal Terrestrial Radio Access Network (E-UTRAN); X2 application protocol (X2AP) (Release 10)," 3GPP TS 36.423, V10.5.0, pp. 1-132, 3rd Generation Partnership Project, Valbonne, France (Mar. 2012).

"Carrier Selection for Macro-Pico Scenario," 3GPP TSG RAN WG3 Meeting #73bis, Zhuhai, China, R3-112498, 3rd Generation Partnership Project, Valbonne, France (Oct. 10-14, 2011).

Galindo-Serrano et al., "Distributed Learning in Multiuser OFDMA Femtocell Networks," IEEE 73rd Vehicular Technology Conference (VTC Spring), Institute of Electrical and Electronics Engineers, New York, New York (May 15-18, 2011).

\* cited by examiner

METHOD AND DEVICE FOR DETERMINING TRANSMISSION POWER

CROSS-REFERENCE TO RELATED APPLICATIONS

This application is a continuation of International Patent Application No. PCT/CN2013/073012, filed on Mar. 21, 2013, which claims priority to Chinese Patent Application No. 201210076286.2, filed on Mar. 21, 2012, both of which are hereby incorporated by reference in their entireties.

TECHNICAL FIELD

The present invention relates to a field of communication technologies, and particularly, to a method and a device for determining a transmission power.

BACKGROUND

A wireless heterogeneous network (Heterogeneous Network, HetNet for short) is generally composed of various networks, such as a Macro cell, a Pico cell, a Femto cell, and the like. The different cells in the HetNet network may share the same radio resource. However, when different cells send downlink signals to respective pieces of user equipment (UE) using the same radio resource, signal interference may occur between the different cells, and thus user experience is degraded.

When a serving base station of an aggressor cell transmits a downlink signal on the same radio resource, the transmission power used on the same radio resource will affect the cell capacity of the aggressor cell and a victim cell. Specifically, when the aggressor cell transmits the downlink signal on the same radio resource at a lower transmission power, the capacity of the victim cell could increase by sacrificing the capacity of the aggressor cell itself, on the contrary, when the aggressor cell transmits the downlink signal on the same radio resource at a higher transmission power, the aggressor cell would increase its own capacity by sacrificing the capacity of the victim cell. Up to now, there is no effective solution to set the transmission power used by the serving base station of the aggressor cell on the same radio resource so that a reasonable compromise between the cell capacities of the aggressor cell and the victim cell can be guaranteed.

SUMMARY

An aspect of the present invention provides a method for determining a transmission power, including: receiving, by a power determining device, capacity information of a first cell sent by a serving base station of the first cell, wherein the capacity information of the first cell corresponds to a transmission power preset by a serving base station of a second cell on a specific resource of the second cell, and the specific resource is a radio resource shared by the first cell and the second cell; and determining, by the power determining device, a transmission power used by the serving base station of the second cell on the specific resource of the second cell according to the capacity information of the first cell.

Another aspect of the present invention provides a power determining device, including: a receiver and a first processor, wherein the receiver is configured to receive capacity information of a first cell sent by a serving base station of the first cell, the capacity information of the first cell corresponds to a transmission power preset by a serving base station of a second cell on a specific resource of the second cell, the specific resource is a radio resource shared by the first cell and the second cell, and the first processor is configured to determine a transmission power used by the serving base station of the second cell on the specific resource of the second cell according to the capacity information of the first cell.

Still another aspect of the present invention provides a method for determining a transmission power, including: sending, by a serving base station of a first cell, capacity information of the first cell to a serving base station of a second cell, wherein the capacity information of the first cell corresponds to a transmission power preset by the serving base station of the second cell on a specific resource of the second cell, the specific resource is a radio resource shared by the first cell and the second cell; and the first capacity information is used by the serving base station of the second cell to determine a transmission power used on the specific resource of the second cell.

Another aspect of an embodiment of the present invention provides a base station, including: a transmitter, configured to send capacity information of a first cell to a serving base station of a second cell, wherein the capacity information of the first cell corresponds to a transmission power preset by the serving base station of the second cell on a specific resource of the second cell, the specific resource is a radio resource shared by the first cell and the second cell, and the first capacity information is used by the serving base station of the second cell to determine a transmission power used on the specific resource of the second cell.

With the above-mentioned technical solution provided in the present invention, the power determining device receives the capacity information of the first cell sent by the serving base station of the first cell, and determines the transmission power used by the serving base station of the second cell on the specific resource of the second cell according to the capacity information of the first cell, and thus the capacity of the first cell (i.e. victim cell) can be guaranteed.

BRIEF DESCRIPTION OF DRAWINGS

To illustrate technical solutions in embodiments of the present invention more clearly, a brief introduction on the accompanying drawings which are needed in the description of the embodiments of the present invention will be given below. The accompanying drawings described below are only some of the embodiments of the present invention.

DESCRIPTION OF EMBODIMENTS

To make the objectives, technical solutions, and advantages of the present invention more clear, embodiments of the present invention are hereinafter described in detail, with reference to the accompanying drawings.

Figure 1:
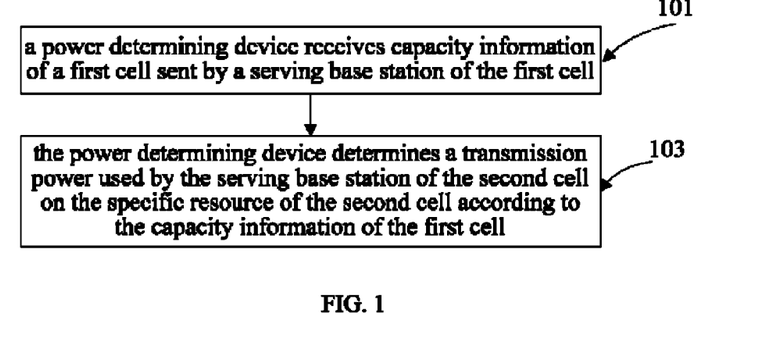
FIG. 1 is a schematic flow chart illustrating a method for determining a transmission power as provided by a specific embodiment of the present invention.

Referring to FIG. 1, an embodiment provides a method for determining a transmission power, and includes the following content.

At 101, a power determining device receives capacity information of a first cell sent by a serving base station of the first cell, wherein the capacity information of the first cell corresponds to a transmission power preset by a serving base station of a second cell on a specific resource of the second cell, and the specific resource is a radio resource shared by the first cell and the second cell.

At 103, the power determining device determines a transmission power used by the serving base station of the second cell on the specific resource of the second cell according to the capacity information of the first cell.

With the above-mentioned technical solution provided by the present embodiment, a power determining device receives capacity information of a first cell sent by a serving base station of the first cell, and determines a transmission power used by a serving base station of a second cell on the specific resource of the second cell according to the capacity information of the first cell, and thus the capacity of the first cell can be guaranteed.

In the embodiment of the present invention, a victim cell is referred to as the first cell and an aggressor cell is referred to as the second cell, and the radio resource shared by the first cell and the second cell is referred to as the specific resource. In the following embodiments, the serving base station of the first cell may be referred to as the first base station for short and the serving base station of the second cell may be referred to as the second base station for short.

Specifically, in the above 103, that the power determining device determines the transmission power used by the serving base station of the second cell on the specific resource of the second cell according to the capacity information of the first cell, includes that the power determining device calculates an average capacity of the first cell according to the capacity information of the first cell, and determines the transmission power used by the serving base station of the second cell on the specific resource of the second cell. More specifically, that the power determining device determines the transmission power used by the serving base station of the second cell on the specific resource of the second cell, includes that the power determining device determines a maximum transmission power at which the average capacity of the first cell satisfies a predetermined capacity threshold, and takes the maximum transmission power as the transmission power used by the serving base station of the second cell on the specific resource of the second cell.

In a process of implementation, assume that the power determining device receives capacity information of first cells sent by N first base stations, and assume that the transmission powers preset by the second base station on the specific resource of the second cell are P1, P2, P3, and P4. For example: the capacities of the first cell calculated by the first base station No. 1 are C1(1), C2(1), C3(1) and C4(1), which have a one-to-one correspondence with transmission powers P1, P2, P3, and P4 preset by the second base station on the specific resource of the second base station; the capacities of the first cell calculated by the first base station No. 2 are C1(2), C2(2), C3(2) and C4(2), which have a one-to-one correspondence with the transmission powers P1, P2, P3, and P4 preset by the second base station on the specific resource of the second cell; the capacities of the first cell calculated by the first base station No. N are C1(N), C2(N), C3(N) and C4(N), which have a one-to-one correspondence with the transmission powers P1, P2, P3, and P4 preset by the second base station on the specific resource of the second cell.

The power determining device calculates the average capacities of the N first cells which correspond to the transmission powers P1, P2, P3 and P4 preset by the second base station on the specific resource of the second cell respectively, and for P1, the average capacity of the N first cells is:

$$C(P1) = \frac{L_k}{N} \sum_{k=1}^{N} C1(k),$$

wherein $L_k$ is a load factor of the first cell No. k. In a process of implementation, the first base station and the second base station exchange their load information when establishing an X2 connection. The second base station receives the load information sent by the first base station, and parses the load information to obtain the load factor of the first cell. The average capacities of the N first cells corresponding to the remaining P2, P3 and P4 are calculated in a similar manner.

The power determining device determines the maximum transmission power at which the average capacity of the N first cells satisfies a predetermined capacity threshold (Cthreshold), and takes the maximum transmission power as the transmission power used by the serving base station of the second cell on the specific resource of the second cell. For example, assuming P1<P2<P3<P4, and that the average capacities of the N first cells corresponding to P1 and P2 satisfy the predetermined capacity threshold Cthreshold, the power determining device preferentially selects P2 as the transmission power used by the serving base station of the second cell on the specific resource of the second cell. That is, while the threshold of the average capacity of the N first cells is satisfied, the larger transmission power may enable a larger capacity of the second cell.

In the above-mentioned embodiment, the power determining device receives the capacity information of the first cell sent by the serving base station of the first cell, the transmission power used by the serving base station of the second cell on the specific resource of the second cell according to the capacity information of the first cell, so that the average capacity of the first cell is larger than a certain capacity threshold, and thus the capacity of the first cell is guaranteed.

In an optional embodiment, the above-mentioned embodiment may further at 102, the power determining device obtains capacity information of the second cell, wherein the capacity information of the second cell corresponds to the transmission power preset by serving base station of the second cell on the specific resource of the second cell. The 101 and 102 may be executed simultaneously or there is no limitation on the order by which those two steps are executed.

In this case, the above 103 could be: 103', the power determining device the transmission power used by the serving base station of the second cell on the specific resource of the second cell according to the capacity information of the first cell and the capacity information of the second cell. With the above-mentioned optional embodiment, the maximization of the total capacity of the first cell and the second cell can be guaranteed.

In a process of implementation, the method of the above-mentioned optional embodiment, specifically includes: the first base station sends the capacity information of the first cell to the second base station or a control node, wherein the capacity information of the first cell corresponds to the transmission power preset by the second base station on the specific resource of the second cell; after receiving the capacity information of the first cell, the second base station or the control node obtains the capacity information of the second cell, wherein the capacity information of the second cell also corresponds to the transmission power preset by the second base station on the specific resource of the second cell; after that, the second base station or the control node determines the transmission power used by the second base station on the specific resource of the second cell according to the capacity information of the first cell and the capacity information of the second cell, to guarantee that the total capacity of the first cell and the second cell may be maximized.

In an embodiment of the present invention, the control node includes but is not limited to a mobility management entity (MME), a network management node OAM (Operation, Administration, Maintenance), or an operation support system (OSS) in a core network. In an embodiment of the present invention, the control node may also be a base station different from the first base station and the second base station.

In an embodiment of the present invention, the specific resource may include one or more of time domain resource, frequency domain resource and space domain resource, wherein the time domain resource, the frequency domain resource or the space domain resource may include but not limits to a single carrier, a set of carriers, a single almost blank subframe (ABS), a set of ABSs, a single physical resource block, a set of physical resource blocks, a single beam or a set of beams.

In an embodiment of the present invention, the transmission power on the specific resource generally has 8 optional step values, in particular, is determined by the pre-configured configuration parameters Pa and Pb together. Pb is set for a cell (is cell-specific), Pa is set for a user equipment in the cell (is UE-specific), and specifically, the configuration of the configuration parameters of the transmission power on the specific resource may be as follows:

```
PDSCH-ConfigCommon: : =SEQUENCE{
   referenceSignalpower    INTEGER(-60..50),
   p-b                     INTEGER (0..3) //configuration of
                           configuration
parameter Pb
}
PDSCH-ConfigDedicated::=SEQUENCE{
   p-a                     ENUMERATED{
                           db-6,db-4dot77,db-3,db-1dot77,
                           db0,db1,db2,db3} //configuration of
                           configuration
parameter Pa, 8 step values in total
}
```

For the application scenario of the enhanced Inter-Cell Interference Coordination (eICIC) mechanism, the specific resource is a single ABS subframe or a set of ABS subframes. Specifically, as the specific resource, the single ABS or the set of ABS subframes is preset by the second base station, for example, the second base station designates an ABS subframe or a set of subframes as ABS subframe(s), and the setting condition of the ABS subframe(s) may be identified by an ABS subframe pattern.

In an embodiment of the present invention, the ABS subframe pattern (ABS Pattern) f(m) also identifies the proportion of the number of the ABS subframes set by the second base station to the total number of the subframes. For example, the ABS subframe pattern includes pattern 1/8, 2/8, 3/20 or the like, wherein the pattern 1/8 indicates that one of the eight subframes is set as the ABS subframe by the base station of the aggressor cell, the pattern 2/8 indicates that two of the eight subframes are set as ABS subframes by the base station of the aggressor cell, and similarly, the pattern 3/20 indicates that three of the twenty subframes are set as the ABS subframes by the base station of the aggressor cell. Specifically, the setting condition of the ABS subframes is shown as follows:

```
FDD patterns;
   (1/8,1,ABS)         [10000000,......]  // the ABS subframe is
indicated by 1, and the non-ABS subframe is indicated by 0
   (2/8,2,ABS)         [11000000,......]  // the ABS subframe is indicated
by 1, and the non-ABS subframe is indicated by 0
   (3/20,1,MBSF)       [1000010000 1000000000]  // the ABS
subframe is indicated by 1, and the non-ABS subframe is indicated by 0.
```

Then, in order to guarantee that the total capacity of the first cell and the second cell may be maximized, it is necessary to determine the transmission power used by the second base station on a single ABS or a set of ABSs. Specifically referring to FIG. 2, a method for determining a transmission power includes the following content.

Figure 2:
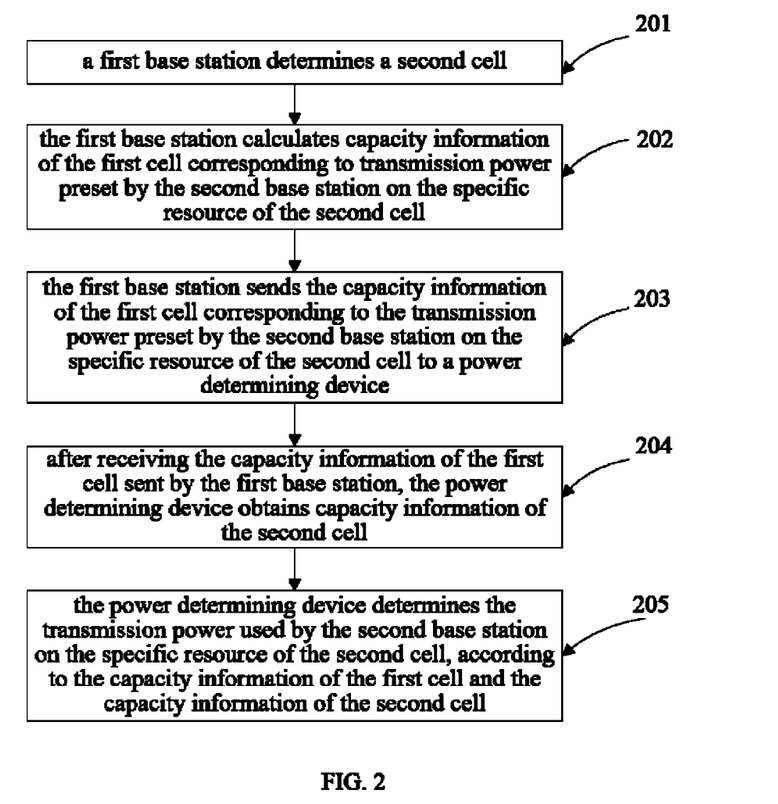
FIG. 2 is a schematic flow chart illustrating a method for determining a transmission power as provided by a specific embodiment of the present invention.

At 201, a first base station determines a second cell. Specifically, the first base station determines the second cell according to measurement information of each of the neighboring cells reported by a user equipment served by the first cell, wherein the measurement information may include but not limits to a reference signal receiving power (Reference Signal Receiving Power, RSRP) or a channel quality indicator (Channel Quality Indicator, CQI).

In implementation of an embodiment of the present invention, the first base station configures the user equipment served by the first cell to measure the RSRP of each of the neighboring cells; the first base station receives the RSRPs of each of the neighboring cells reported by the user equipment served by the first cell; then, the first base station averages the RSRPs of a same neighboring cell reported by the user equipment served by the first cell, obtains the average RSRP of each of the neighboring cells, and takes the neighboring cell with maximum average RSRP as the second cell.

In addition, in implementation of an embodiment of the present invention, the first base station may configure the user equipment served by the first cell to measure the CQI of the neighboring cell, and when the first base station calculates the average RSRP of each of the neighboring cells, the first base station may average the RSRPs of a same neighboring cell reported by the user equipment, served by the first cell, whose channel quality indicator (Channel Quality Indicator, CQI) is less than a first predetermined value, to obtain the average RSRP of each of the neighboring cells, so as to reduce the computation and improve the efficiency of determining the second cell.

Alternatively, in implementation of an embodiment of the present invention, the first base station configures the user equipment served by the first cell to measure the RSRP of each of the neighboring cells; the first base station receives the neighboring cells whose RSRPs are larger than a second predetermined value reported by the user equipment served by the first cell; then the first base station does statistics on the occurrence probability of each of the neighboring cells reported by the user equipment served by the first cell, and takes the neighboring cell with the largest occurrence probability as the second cell.

In addition, in implementation of an embodiment of the present invention, the first base station may configure the user equipment served by the first cell to measure the CQI of each of the neighboring cells, and when the first base station does statistics on the occurrence times of each of the neighboring cells, the first base station may only do statistics on that of the neighboring cells reported by the user equipment, served by the first cell, whose CQI is less than the first predetermined value, so as to reduce the computation and improve the efficiency of determining the second cell.

Of course, in implementation of an embodiment of the present invention, the first base station may configure the user equipment served by the first cell to measure and report the CQI of the neighboring cell, and determine the second cell according to the CQI reported by the user equipment. The determining manner is the same as the method for determining the second cell according to the RSRPs reported by the user equipment served by the first cell, and thus will not be described redundantly herein.

At 202, the first base station calculates capacity information of the first cell corresponding to a transmission power preset by the second base station on the specific resource of the second cell, wherein the capacity information may include but not limit to capacity or frequency spectrum efficiency.

In an embodiment of the present invention, the transmission power preset by the second base station on the specific resource of the second cell could be: the transmission power of the second base station on the specific resource of the second cell pre-negotiated by the first base station and the second base station through an X2 interface when the X2 interface is established between the first base station and the second base station.

In addition, in an embodiment of the present invention, the transmission power preset by the second base station on the specific resource of the second cell could be the transmission power of the second base station on the specific resource of the second cell set by the first base station.

Specifically, that the first base station calculates the capacity information of the first cell which corresponds to the transmission power preset by the second base station on the specific resource of the second cell may include: calculating the capacity information of the first cell which corresponds to the transmission power preset by the second base station on the specific resource of the second cell according to the measurement information of the current cell and the neighboring cells reported by the user equipment served by the first cell, wherein the measurement information may include but not limit to an RSRP or a CQI.

In an embodiment of the present invention, when there are a plurality of transmission powers preset by the second base station on the specific resource of the second cell, there are also a plurality of pieces of capacity information of the first cell which have a one-to-one correspondence with the transmission powers preset by the second base station on the specific resource of the second cell.

In implementation of an embodiment of the present invention, if the capacity information of the first cell is a capacity of the first cell, the first base station may calculate pieces of capacity information of the first cell which have a one-to-one correspondence with a plurality of transmission powers preset by the second base station on the specific resource of the second cell according to the measurement information of the current cell and the neighboring cells reported by the user equipment served by the first cell by using calculation manners as follows:

Manner 1: if the first base station schedules each of the user equipments served by the first cell on a specific resource of the first cell respectively in a round robin (Round Robin, RR) scheduling manner, and the specific resource is a single ABS or a set of ABSs, then each of a plurality of transmission powers preset by the second base station on the specific resource of the second cell is taken as a current power in turn, and the capacity of the first cell corresponding to the current power is calculated, specifically including: calculating the capacity obtained by each of the user equipments scheduled on the specific resource of the first cell according to the measurement information of the current cell and the neighboring cells reported by each of the user equipments served by the first cell, and then calculating the capacity of the first cell corresponding to the current power according to the capacity obtained by each of the user equipments scheduled on the specific resource of the first cell.

In an optional embodiment, taking the measurement information being RSRP as an example, calculating the capacity obtained by each of the user equipments scheduled on the specific resource includes:

When a user equipment UEn served by the first cell is scheduled on the specific resource of the first cell, that is, when the first base station sends downlink signal to the UEn by using the specific resource in the first cell. As an optional embodiment, the following Equation 1 may be used to calculate the capacity obtained by the UEn scheduled on the specific resource of the first cell.

$$C_n^{ABS}(m, x) = \log_2\left\{1 + \frac{RSRP_i}{\sum_{k=0, k \neq m}^{K} x_k RSRP_k + x * RSRP_m}\right\} \quad \text{(Equation 1)}$$

Before explaining every item in Equation 1, it is to be noted that the second cell determined in step 201 is a strong aggressor cell of the first cell, and in implementation, in addition to strong interference from the second cell, the first cell may be weakly interfered with by other cells. Herein, the cells other than the second cell which interfere with the first cell are referred to as third cells. In an embodiment of the present invention, in order to further guarantee the capacity of the first cell, besides considering the strong interference from the second cell, the interference from the third cell is also considered.

Furthermore, before the first base station calculates the capacity information of the first cell corresponding to the transmission power preset by the second base station on the specific resource of the second cell, the first base station obtains information about the ABS subframe set by the second base station, and obtains information about the ABS subframe set by a serving base station of each cell in the third cells respectively, wherein the information about the ABS subframe includes but is not limited to an ABS subframe pattern.

Specifically, the first base station receives the information about the ABS subframe (ABS information) sent by the second base station through the X2 interface established with the second base station, and receives the information about the ABS subframe sent by the serving base station of each cell in the third cells through the X2 interface established therebetween.

Hereinafter, every item in Equation 1 is described in detail, and in particular $C_n^{ABS}$ (m,x) is the capacity obtained by the UEn scheduled on the specific resource of the first cell; $RSRP_i$ is the RSRP of the current cell (i.e. the first cell) reported by the UEn; $RSRP_k$ is the RSRP of the neighboring cell, in particular, the kth cell in the third cells, reported by the UEn; $RSRP_m$, is the RSRP of the neighboring cell, in particular, the second cell, reported by the UEn; $X_k$ is the ratio of the transmission power used by the serving base station of the kth cell in the third cells on the specific resource of the kth cell with respect to the transmission power of the reference signal (Reference Signal, RS) sent by itself.

In an embodiment of the present invention, the first base station determines whether or not the specific resource set by the second base station is the ABS subframe set by the serving base station of the kth cell, according to the previously obtained ABS subframe information set by the second base station and the ABS subframe information set by the serving base station of the kth cell. If the specific resource set by the second base station is not the ABS subframe set by the serving base station of the kth cell, then $X_k$=1. If the specific resource set by the second base station is the ABS subframe set by the serving base station of the kth cell, then the first base station may receive the $X_k$ sent by the serving base station of the kth cell through the X2 interface which has been established with the serving base station of the kth cell. The X in Equation 1 is the ratio of the current power with respect to the transmission power at which the second base station sends the RS, wherein the current power is one of the configurable eight step values of the transmission power described above.

After calculating the capacity obtained by each of the user equipments served by the first cell scheduled on the specific resource of the first cell according to Equation 1, the first base station adds up the capacity obtained by each of the user equipments on the specific resource of the first cell to get an average value, and obtains the capacity of the first cell corresponding to the current power. In an optional embodiment, in particular, the following Equation 2 may be used to calculate the capacity of the first cell corresponding to the current power:

$$C_i^{Pico}(m, x) = \frac{1}{N} \sum_{n=0}^{N} C_n^{ABS}(m, x)$$ (Equation 2)

In Equation 2, $C_i^{pico}$(m,x) is the capacity of the first cell corresponding to the current power; N is the total number of the user equipments served by the first cell, and since the user equipments served by the base station have been registered in the base station, the first base station may be aware of the total number of the user equipments served by the first cell; $C_n^{ABS}$ (m,x) is the capacity of the first cell obtained by the user equipments served by the first cell scheduled on the specific resource of the first cell.

In implementation of this embodiment, when the measurement information is a CQI, the method for calculating the capacity information of the first cell corresponding to the transmission power preset by the second base station on the specific resource of the second cell includes: obtaining the frequency spectrum efficiency corresponding to the reported CQI directly according to a CQI reported by the user equipment served by the first cell on the specific resource of the first cell; then processing, e.g. averaging, weightedly averaging, or the like, the frequency spectrum efficiency corresponding to the CQI reported by all the user equipments, to obtain the processed frequency spectrum efficiency of the first cell, and takes it as the capacity information of the first cell corresponding to the transmission power preset by the second base station on the specific resource of the second cell.

Manner 2: if the first base station schedules the user equipment served by the first cell on the specific resource or non-specific resource of the first cell in a round robin (Round Robin, RR) scheduling manner, the specific resource is a single ABS or a set of ABSs, and the non-specific resource is a single non-ABSs or a set of non-ABSs, then each of a plurality of values of transmission power preset by the second base station on the specific resource of the second cell is taken as a current power in turn, and the capacity of the first cell corresponding to the current power is calculated, specifically, including: calculating the capacity obtained on the specific resource of the first cell by each of the user equipments scheduled on the specific resource of the first cell according to measurement information of the current cell and the neighboring cells reported by each of the user equipments scheduled on the specific resource of the first cell; and calculating the capacity obtained on the non-specific resource of the first cell by each of the user equipments scheduled on the non-specific resource of the first cell according to measurement information of the current cell and the neighboring cells reported by each of the user equipments scheduled on the non-specific resource of the first cell; then calculating the capacity of the first cell corresponding to the current power, according to the capacity obtained on the specific resource of the first cell by each of the user equipments scheduled on the specific resource of the first cell and the capacity obtained on the non-specific resource of the first cell by each of the user equipments scheduled on the non-specific resource of the first cell.

In an optional embodiment, taking the measurement information being RSRP as an example, the calculating manner, in which the obtained capacity on the specific resource of the first cell by each of the user equipments scheduled on the specific resource of the first cell is calculated, may refer to Equation 1, and thus will not be described redundantly herein.

In another optional embodiment, taking the measurement information being RSRP as an example, the following Equation 3 may be used to calculate the capacity obtained on the non-specific resource of the first cell by each of the user equipments scheduled on the non-specific resource of the first cell:

$$C_n^{non\text{-}ABS}(m, x) = \log_2\left\{1 + \frac{RSRP_i}{\sum_{k=0}^{K} RSRP_k}\right\}$$ (Equation 3)

In Equation 3, $C_n^{non\text{-}ABS}$(m,x) is the capacity obtained on the non-specific resource by the UEn scheduled on the non-specific resource of the first cell; $RSRP_i$ is the RSRP of the current cell, i.e. the first cell, reported by the user equipment scheduled on the non-specific resource of the first cell; $RSRP_k$ is the RSRP of the neighboring cell, in particular, the kth cell in the third cells, reported by the user equipment scheduled on the non-specific resource of the first cell.

In an optional embodiment, the first base station may process, by using the following Equation 4, the cell capacity obtained on the specific resource of the first cell by each of the user equipments scheduled on the specific resource of the first cell which is calculated by Equation 1 and Equation 2 and the cell capacity obtained on the non-specific resource of the first cell by each of the user equipments scheduled on the non-specific resource of the first cell, to obtain the capacity of the first cell corresponding to the current transmission power:

$$C_i^{Pico}(m, x) = \frac{f(m)}{N}\sum_{n=0}^{N} C_n^{ABS}(m, x) + \frac{1-f(m)}{N}\sum_{n=0}^{N} C_n^{non\text{-}ABS}(m, x) \quad \text{(Equation 4)}$$

In Equation 4, $C_i^{pico}(m,x)$ is the capacity of the first cell corresponding to the current power; $C_n^{ABS}(m,x)$ is the capacity obtained on the specific resource of the first cell by the user equipment scheduled on the specific resource of the first cell; $C_n^{non\text{-}ABS}(m,x)$ is the capacity obtained on the non-specific resource of the first cell by the user equipment scheduled on the non-specific resource of the first cell; N is the total number of the user equipments served by the first base station, wherein since the user equipments served by the base station have been registered in the base station, the first base station may be aware of the total number of the user equipments served by the first cell; and f(m) in Equation 4 is an ABS pattern set by the second base station.

In implementation of this embodiment, when the measurement information is a CQI, the method for calculating the capacity information of the first cell corresponding to the transmission power preset on the specific resource of the second cell by the second base station includes: obtaining the frequency spectrum efficiency corresponding to the reported CQI directly according to the CQI reported by the user equipment served by the first cell on the specific resource of the first cell, and then processing, e.g. averaging, weighted averaging, or the like, the frequency spectrum efficiency corresponding to the CQIs reported by all the user equipments, to obtain the processed frequency spectrum efficiency of the first cell, and taking it as the capacity information of the first cell corresponding to the transmission power preset by the second base station on the specific resource of the second cell.

Manner 3: If the first base station schedules a user equipment located in a cell range extension (Cell Range Extension, CRE) area on the specific resource of the first cell in an RR scheduling manner, schedules user equipments in other areas on the non-specific resource of the first cell in the RR manner, the specific resource is a single ABS or a set of ABSs, and the non-specific resource is a single non-ABS or a set of non-ABSs, then each of a plurality of transmission powers preset by the second base station on the specific resource of the second cell is taken as a current power in turn, and calculates the capacity of the first cell corresponding to the current power, specifically, including: calculating the capacity obtained on the specific resource of the first cell by each of the user equipments scheduled on the specific resource of the first cell according to measurement information of the current cell and the neighboring cell reported by each of the user equipments scheduled on the specific resource of the first cell; calculating the capacity obtained on the non-specific resource of the first cell by each of the user equipments scheduled on the non-specific resource of the first cell according to measurement information of the current cell and the neighboring cell reported by each of the user equipments scheduled on the non-specific resource of the first cell; then calculating the capacity of the first cell corresponding to the current power, according to the capacity obtained on the specific resource of the first cell by each of the user equipments scheduled on the specific resource of the first cell and the capacity obtained on the non-specific resource of the first cell by each of the user equipments scheduled on the non-specific resource of the first cell.

As an optional embodiment, taking the measurement information being RSRP as an example, the calculating manner, in which the obtained capacity on the specific resource of the first cell by each of the user equipments scheduled on the specific resource of the first cell is calculated, may refer to the Equation 1, and thus will not be described redundantly herein.

As another optional embodiment, taking the measurement information being RSRP as an example, the calculating manner, in which the obtained capacity on the non-specific resource of the first cell by each of the user equipments scheduled on the non-specific resource of the first cell is calculated, may refer to the Equation 3, and thus will not be described redundantly herein.

In an optional embodiment, the first base station may process, by using the following Equation 5, the capacity obtained on the specific resource of the first cell by each of the user equipments scheduled on the specific resource of the first cell and the capacity obtained on the non-specific resource of the first cell by each of the user equipments scheduled on the non-specific resource of the first cell, to obtain the capacity of the first cell corresponding to the current power:

$$C_i^{Pico}(m, x) = \frac{f(m)}{L}\sum_{n \in S_L} C_n^{ABS}(m, x) + \frac{1-f(m)}{N-L}\sum_{n \in S/S_L} C_n^{non\text{-}ABS}(m, x) \quad \text{(Equation 5)}$$

In Equation 5, $C_i^{pico}(m,x)$ is the capacity of the first cell corresponding to the current power; $C_n^{ABS}(m,x)$ is the capacity obtained on the specific resource of the first cell by the user equipment scheduled on the specific resource of the first cell; $C_n^{non\text{-}ABS}(m,x)$ is the capacity obtained on the non-specific resource of the first cell by the user equipment scheduled on the non-specific resource of the first cell; N is the total number of the user equipments served by the first base station, wherein since the user equipments served by the base station have been registered in the base station, the first base station may be aware of the total number of the user equipments served by the first cell; f(m) is an ABS pattern set by the second base station; and L is the number of the user equipments located in the CRE extension area of the first cell.

In implementation of this embodiment, when the measurement information is a CQI, the method for calculating the capacity information of the first cell corresponding to the transmission power preset on the specific resource of the second cell by the second base station includes: obtaining the frequency spectrum efficiency corresponding to the reported CQI directly according to the CQI reported by the user equipment served by the first cell on the specific resource of the first cell, then processing, e.g. averaging, weightedly averaging, or the like, the frequency spectrum efficiency corresponding to the CQI reported by all the user equipments, to obtain the processed frequency spectrum efficiency of the first cell, and taking it as the capacity information of the first cell corresponding to the transmission power preset by the second base station on the specific resource of the second cell.

At 203, the first base station sends the capacity information of the first cell corresponding to the transmission power preset by the second base station on the specific resource of the second cell to a power determining device.

In an embodiment of the present invention, specifically, the power determining device may be the second base station or a control node. For the scenario in which the first base station and the power determining device have pre-negotiated the transmission power preset by the second base station on the specific resource of the second cell, the first base station only sends the calculated capacity information of the first cell to the power determining device.

For the scenario in which the first base station and the power determining device have not pre-negotiate the transmission power preset by the second base station on the specific resource of the second cell, when the first base station sends the capacity information of the first cell corresponding to the transmission power preset by the second base station on the specific resource of the second cell to the power determining device, the first base station further sends information about the transmission power preset by the second base station on the specific resource of the second cell corresponding to the capacity information of the first cell to the power determining device.

The information about the transmission power preset by the second base station on the specific resource of the second cell may specifically include but not limit to the transmission power preset by the second base station on the specific resource of the second cell or the level information of the transmission power preset by the second base station on the specific resource of the second cell.

In an embodiment of the present invention, if the power determining device is the control node, when sending the capacity information of the first cell to the control node, the first base station also sends the identity of the second base station to the control node, so that the control node may determine the transmission power used by the second base station, which is identified by the received identification, on the specific resource of the second cell.

In specific implementation of an embodiment of the present invention, if the power determining device is the second base station, then the first base station sends the capacity information of the first cell and/or the information about the transmission power preset by the second base station on the specific resource of the second cell corresponding to the capacity information of the first cell to the second base station through an X2 interface established with the second base station.

If the power determining device is the control node, for example, if the control node is an MME, then the first base station sends the capacity information of the first cell and/or the information about the transmission power preset by the second base station on the specific resource of the second cell corresponding to the capacity information of the first cell to the control node through an S1 interface established with the MME; and if the control node is an OAM, the first base station sends the capacity information of the first cell and/or the information about the transmission power preset by the second base station on the specific resource of the second cell corresponding to the capacity information of the first cell to the control node through a southbound interface Itf-S established with the OAM.

At 204, after receiving the capacity information of the first cell sent by the first base station, the power determining device obtains capacity information of the second cell, wherein the capacity information of the second cell corresponds to the transmission power preset by the second base station on the specific resource of the second cell.

Specifically, obtaining the capacity information of the second cell may include the following. If the power determining device is the second base station, for the scenario in which the first base station and the power determining device have pre-negotiated the transmission power preset by the second base station on the specific resource of the second cell, the second base station calculates the capacity information of the second cell corresponding to the transmission power preset by the second base station on the specific resource of the second cell, according to the transmission power preset on the specific resource of the second cell and the measurement information of the current cell and the neighboring cell reported by the user equipment served by the second cell. In this scenario, the transmission power preset by the second base station on the specific resource of the second cell is the transmission power of the second base station on the specific resource of the second cell pre-negotiated by the first base station and the second base station.

If the power determining device is the second base station, for the scenario in which the first base station and the power determining device have not pre-negotiated the transmission power preset by the second base station on the specific resource of the second cell, the second base station receives the information about the transmission power preset by the second base station on the specific resource of the second cell corresponding to the capacity information of the first cell sent by the first base station; and then the second base station calculates the capacity information of the second cell corresponding to the transmission power preset by the second base station on the specific resource of the second cell, according to the transmission power preset on the specific resource of the second cell and the measurement information of the current cell and the neighboring cells reported by the user equipment served by the second cell. In this scenario, the transmission power preset by the second base station on the specific resource of the second cell is the received power which corresponds to the information about the transmission power preset by the second base station on the specific resource of the second cell corresponding to the capacity information of the first cell.

If the power determining device is the second base station, for the scenario in which the first base station and the power determining device have not pre-negotiated the transmission power preset by the second base station on the specific resource of the second cell, the second base station receives the information about the transmission power preset by the second base station on the specific resource of the second cell corresponding to the capacity information of the first cell sent by the first base station; and then the second base station calculates the capacity information of the second cell corresponding to the transmission power preset by the second base station on the specific resource of the second cell, according to the transmission power preset on the specific resource of the second cell and the measurement information of the current cell and the neighboring cells reported by the user equipment served by the second cell. In this scenario, the transmission power preset by the second base station on the specific resource of the second cell is the received power which corresponds to the information about the transmission power preset by the second base station on the specific resource of the second cell corresponding to the capacity information of the first cell.

In an embodiment of the present invention, the process that the second base station calculates the capacity information of the second cell may refer to the process in step 202 in which the first base station calculates the capacity information of the first cell, and thus will not be described redundantly herein.

If the power determining device is the control node, the control node receives the capacity information of the second cell sent by the second base station. If the power determining device is the control node, for the scenario in which the first base station and the power determining device have not pre-negotiated the transmission power preset by the second base station on the specific resource of the second cell, when the control node receives the capacity information of the second cell sent by the second base station, the control node further receives the information about the transmission power preset by the second base station on the specific resource of the second cell corresponding to the capacity information of the second cell, which is sent by the second base station.

At 205, the power determining device determines the transmission power used by the second base station on the specific resource of the second cell, according to the capacity information of the first cell and the capacity information of the second cell.

In implementation of an embodiment of the present invention, if there are a plurality of transmission powers preset by the second base station on the specific resource of the second cell, then there are a plurality of pieces of capacity information of the first cell which have a one-to-one correspondence with the transmission powers preset by the second base station on the specific resource of the second cell, and there are a plurality of pieces of capacity information of the second cell which have a one-to-one correspondence with the transmission powers preset by the second base station on the specific resource of the second cell.

Then, determining the transmission power used by the second base station on the specific resource of the second cell according to the capacity information of the first cell and the capacity information of the second cell includes: calculating the total capacity information of the first cell and the second cell according to the capacity information of the first cell and the capacity information of the second cell, wherein there are a plurality of pieces of total capacity information which correspond to the transmission powers preset by the second base station on the specific resource of the second cell; selecting the maximum total capacity information from the plurality pieces of total capacity information calculated, and taking the power corresponding to the maximum total capacity information as the transmission power used by the second base station on the specific resource of the second cell.

For the scenario in which the first base station and the power determining device (e.g. the second base station) have pre-negotiated the transmission power preset by the second base station on the specific resource of the second cell, an example is taken to explain steps 202 to 204. In the example, the first base station calculates the capacities of the first cell C1, C2, C3 and C4 which have a one-to-one correspondence with the transmission powers P1, P2, P3, and P4 preset by the second base station on the specific resource of the second cell; the second base station calculates the capacities of the second cell C1', C2', C3' and C4' which have a one-to-one correspondence with the transmission powers P1, P2, P3, and P4 preset by the second base station on the specific resource of the second cell; the second base station calculates the total capacities of the first cell and second cell C1+C1', C2+C2', C3+C3' and C4+C4' which have a one-to-one correspondence with the transmission powers P1, P2, P3, and P4 preset by the second base station on the specific resource of the second cell; and the second base station selects the maximum total capacity from C1+C1', C2+C2', C3+C3' and C4+C4', e.g. C4+C4', and then the power P4 corresponding to C4+C4' would be the transmission power used by the second base station on the specific resource.

Furthermore, in an embodiment of the present invention, the second cell, as an interference source, may strongly interfere with a plurality of different first cells; then it can be appreciated based on the above description that, each of the first base stations will send a piece of capacity information of the first cell corresponding to the transmission power preset by the second base station on the specific resource of the second cell to the power determining device; in this way, the power determining device shall receive a plurality of pieces of capacity information of the first cells. After that, the power determining device obtains the capacity information of the second cell, the capacity information of the second cell corresponding to the transmission power preset by the second base station on the specific resource of the second cell, and determines the transmission power of the second base station on the specific resource of the second cell according to the plurality of pieces of received capacity information of the first cells and the obtained capacity information of the second cell.

Specifically, the power determining device determines the transmission power of the second base station on the specific resource of the second cell according to the plurality of pieces of received capacity information of the first cells and the obtained capacity information of the second cell: the power determining device determines the total capacity information of the plurality of first cells according to the plurality of received capacity information of the first cells; the power determining device calculates the total capacity information of the plurality of first cells and second cells according to the total capacity information of the plurality of first cells and the capacity information of the second cell; when there are a plurality of transmission powers preset by the second base station on the specific resource of the second cell, there are a plurality of pieces of capacity information of the first cells which have a one-to-one correspondence with the transmission powers preset by the second base station on the specific resource of the second cell, there are a plurality of pieces of capacity information of the second cell which have a one-to-one correspondence with transmission powers preset by the second base station on the specific resource of the second cell, there are a plurality of pieces of total capacity information of the plurality of first cells which have a one-to-one correspondence with the transmission powers preset by the second base station on the specific resource of the second cell, and there are a plurality of pieces of total capacity information of the plurality of first cells and the second cell which have a one-to-one correspondence with the transmission powers preset by the second base station on the specific resource of the second cell; in this case, the maximum value of total capacity information is selected from the plurality of pieces of total capacity information, and the power corresponding to the maximum total capacity information is taken as the transmission power used by the second base station on the specific resource of the second cell.

In an optional embodiment, the total capacity information of the plurality of first cells and second cell may be calculated by using the following Equation 6:

$$C(m, x) = L_i^{Pico} \sum_{i=0} C_i^{Pico}(m, x) + L_m^{Macro} * C_m^{Macro}(m, x) \quad \text{(Equation 6)}$$

In Equation 6, C(m,x) is total capacity information of i first cells and the second cell corresponding to the transmission power preset by the second base station on the specific resource of the second cell; $L_i^{pico}$ is a load factor of the first cell;

$$\sum_{i=0} C_i^{pico}(m, x)$$

is capacity information of the ith first cell corresponding to the transmission power preset by the second base station on the specific resource of the second cell; $C_m^{macro}(m,x)$ is the capacity information of the second cell corresponding to the transmission power preset by the second base station on the specific resource of the second cell; and $L_m^{Macro}$ is a load factor of the second cell.

In an embodiment of the present invention, when the first base station and the second base station establish an X2 connection, the first base station and the second base station transmit their respective load information to each other. The second base station receives the load information sent by the first base station and parses the load information to obtain the load factor of the first cell, wherein the load factor of the second cell may be obtained from its own load information.

In specific implementation of the embodiment of the present invention, for the scenario of carrier aggregation (CA), the specific resource is a single carrier or a set of carriers. In the scenario of CA, if the capacity information of the first cell is the capacity of the first cell, the method for determining the transmission power is similar with the method for determining the transmission power in the scenario of eICIC. The difference is, in the scenario of CA, the way by which the first base station calculates the capacity information of the first cell corresponding to the transmission power preset by the second base station on the specific resource of the second cell, according to the measurement information of the current cell and the neighboring cell reported by the user equipment served by the first cell, is different from the way employed in the scenario of eICIC. A detailed description is as follows:

Similarly, the measurement information being an RSRP is taken as an example to explain that, in the scenario of CA, the first base station schedules each of the user equipments served by the first cell on the specific resource respectively in a round robin (Round Robin RR) scheduling manner. When there are a plurality of transmission powers preset on the specific resource of the second cell, each of the plurality of transmission powers preset by the second base station on the specific resource of the second cell is taken as a current power in turn, the capacity of the first cell corresponding to the current power is calculated, the capacity obtained by each of the user equipments scheduled on the specific resource of the first cell is calculated according to the measurement information of the current cell and the neighboring cells reported by each of the user equipments served by the first cell, respectively, and then the capacity of the first cell corresponding to the current power is calculated according to the capacity obtained by each of the user equipments scheduled on the specific resource of the first cell.

As an optional embodiment, if the user equipment UEn served by the first cell is scheduled on the specific resource of the first cell, the capacity obtained by the UEn on the specific resource of the first cell may be calculated by the following Equation 7:

$$C_n(m, x) = \log_2 \left\{ 1 + \frac{RSRP_i}{\sum_{k=0, k \neq m}^{K} RSRP_k + x * RSRP_m} \right\} \quad \text{(Equation 7)}$$

In the above Equation 7, $C_n(m,x)$ is the capacity obtained by the UEn scheduled on the specific resource of the first cell; $RSRP_i$ is an RSRP of the current cell, i.e., the first cell, reported by the UEn; $RSRP_k$ is an RSRP of the neighboring cell, in particular, the k-th cell in the third cells, reported by the UEn; $RSRP_m$ is an RSRP of the neighboring cell, in particular, the second cell, reported by the UEn; X is the ratio of the current power with respect to the transmission power at which the second base station sends the RS, wherein the current power is one of the configurable eight step values of the transmission power previously described.

After calculating the capacity obtained by each of the user equipments served by the first cell which is scheduled on the specific resource of the first cell according to Equation 7, the first base station adds up the capacity obtained by each of the user equipments served by the first cell on the specific resource of the first cell to get the average value, and obtains the capacity of the first cell corresponding to the current power. As an optional embodiment, in particular, the following Equation 8 may be used to calculate the capacity of the first cell corresponding to the current power:

$$C_i^{Pico}(m, x) = \frac{1}{N} \sum_{n=0}^{N} C_n(m, x) \quad \text{(Equation 8)}$$

In the above equation 8, $C_i^{pico}(m,x)$ is the capacity of the first cell corresponding to the current power; N is the total number of the user equipments served by the first base station, wherein since the user equipment served by base station has been registered in the base station, the first base station is aware of the total number of the user equipments served by the first base station; $C_n(m,x)$ is the capacity obtained by the user equipment UEn, served by the first cell, which is scheduled on the specific resource of the first cell.

In implementation of this embodiment, when the measurement information is a CQI, the method for calculating the capacity information of the first cell corresponding to the transmission power preset by the second base station on the specific resource of the second cell includes: obtaining the frequency spectrum efficiency corresponding to the reported CQI directly according to the CQI reported by the user equipment served by the first cell on the specific resource of the first cell, then processing, e.g. averaging, weightedly averaging, or the like, the frequency spectrum efficiency corresponding to the CQI reported by all the user equipments, to obtain the processed frequency spectrum efficiency of the first cell, and taking it as the capacity information of the first cell corresponding to the transmission power preset by the second base station on the specific resource of the second cell.

After that, the first base station may send the calculated capacity information of the first cell corresponding to the transmission power preset by the second base station on the specific resource of the second cell to the power determining device, so that the power determining device determines the transmission power of the second base station on the specific resource of the second cell according to the received capacity information of the first cell. The detailed description about this part refers to the description of steps 203 to 205, and will not be described redundantly herein.

In specific implementation of an embodiment of the present invention, when the specific resource is a single physical resource block (PRB) or a set of physical resource blocks, the method for determining the transmission power is the same as the method for determining the transmission power in the scenario of CA, and thus will not be described redundantly herein.

With the above-mentioned technical solution provided in the embodiments of the present invention, by the implementation of the technical solution of receiving the capacity information of the first cell sent by the first base station, obtaining the capacity information of the second cell, and then determining the transmission power used by the second base station on the specific resource of the second cell according to the capacity information of the first cell and the capacity information of the second cell, the maximization of the total capacity of the first cell and the second cell can be guaranteed.

Figure 3:
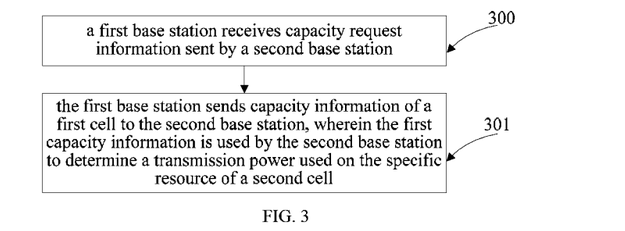
FIG. 3 is a schematic flow chart illustrating a method for determining a transmission power as provided by a specific embodiment of the present invention.

As shown in FIG. 3, the present embodiment provides a method for determining the transmission power, including the following content.

At 301, a first base station sends capacity information of the first cell to a second base station. The capacity information of the first cell corresponds to a transmission power preset by the second base station on a specific resource of the second cell, the specific resource is a radio resource shared by the first cell and the second cell, and the first capacity information is used by the second base station to determine the transmission power on the specific resource of the second cell.

Specifically, the method for determining the transmission power used on the specific resource of the second cell by the second base station may refer to the above described embodiment, and thus will not be described redundantly herein.

As an optional embodiment, the capacity information of the first cell may be included in load information (e.g. Load Information message) sent to the second base station by the first base station.

As another optional embodiment, before step 301 shown in FIG. 3, the method may further include: at 300, the first base station receives capacity request information sent by the second base station. In this case, the above 301 may specifically be: the first base station sends the capacity information of the first cell to the second base station according to the capacity request information. Optionally, the capacity request information may be included in a resource status request message (e.g. Resource Status Request message) sent to the first base station by the second base station; and the capacity information of the first cell may be included in a resource status update message (e.g. Resource Status Update message) sent to the second base station by the first base station.

Furthermore, in the above-mentioned embodiment, the first base station may calculate the capacity information of the first cell according to the transmission power preset by the second base station on the specific resource of the second cell and the measurement information of the first cell and the neighboring cells reported by the user equipment. With the technical solution provided in the above-mentioned embodiment, the second base station sends the capacity information of the first cell to the second base station by the first base station, such that the second base station may determine the transmission power used on the specific resource of the second cell according to the capacity information of the first cell, and thus the capacity of the first cell can be guaranteed.

Figure 4:
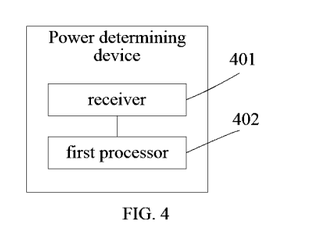
FIG. 4 is an apparatus schematic block diagram illustrating a power determining device as provided by a specific embodiment of the present invention.

Another aspect of an embodiment of the present invention provides a power determining device. Referring to FIG. 4, the power determining device may be the second base station or the control node in the method embodiments, and includes a receiver 401 and a first processor 402.

The receiver 401 is configured to receive capacity information of a first cell sent by a first base station. The capacity information of the first cell corresponds to a transmission power preset by the second base station on a specific resource of a second cell, the specific resource is a radio resource shared by the first cell and the second cell, and the first processor 402 is configured to determine a transmission power used by the second base station on the specific resource of the second cell according to the capacity information of the first cell received by the receiver 401 and the capacity information of the second cell obtained by the first processor 402.

In specific implementation of an embodiment of the present embodiment, the first processor 402 is specifically configured to calculate an average capacity of the first cell according to the capacity information of the first cell, and determine the transmission power used by a serving base station of the second cell on the specific resource of the second cell according to the average capacity of the first cell.

Furthermore, the first processor 402 is specifically configured to determine, for the power determining device, the maximum transmission power at which the average capacity of the first cell satisfies a predetermined capacity threshold, and take the maximum transmission power as the transmission power used by the serving base station of the second cell on the specific resource of the second cell.

In specific implementation of an embodiment of the present embodiment, if there are a plurality of transmission powers preset by the serving base station of the second cell on the specific resource of the second cell, then there are a plurality of pieces of capacity information of the first cell which have a one-to-one correspondence with the transmission powers preset by the serving base station of the second cell on the specific resource of the second cell.

With the above-mentioned technical solution provided in the present invention, the power determining device receives the capacity information of the first cell sent by the serving base station of the first cell, and determines the transmission power used by the serving base station of the second cell on the specific resource of the second cell according to the capacity information of the first cell, and thus the capacity of the first cell (i.e. victim cell) can be guaranteed.

Figure 5:
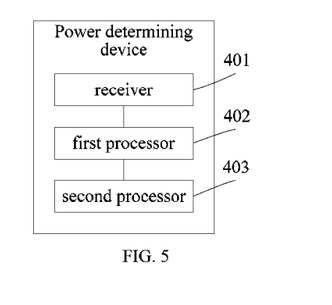
FIG. 5 is an apparatus schematic block diagram illustrating a power determining device as provided by a specific embodiment of the present invention.

Referring to FIG. 5, as an optional embodiment, the device shown in FIG. 4 may further include: a second processor 403, which is configured to obtain capacity information of the second cell, and determine the transmission power used by the serving base station of the second cell on the specific resource of the second cell according to the capacity information of the first cell and the capacity information of the second cell; the capacity information of the second cell corresponds to the transmission power preset by the serving base station of the second cell on the specific resource of the second cell.

In specific implementation of an embodiment of the present invention, for the scenario in which the first base station and the power determining device have not pre-negotiated the transmission power preset by the second base station on the specific resource of the second cell, the receiver 401 is further configured to receive information about the transmission power preset by the second base station on the specific resource of the second cell corresponding to the capacity information of the first cell, which is sent by the first base station.

In specific implementation of an embodiment of the present invention, for the scenario in which the first base station and the power determining device have not pre-negotiated the transmission power preset by the second base station on the specific resource of the second cell, when the power determining device is a control node, the receiver 401 is further configured to receive information about the transmission power preset by the second base station on the specific resource of the second cell corresponding to the capacity information of the second cell, which is sent by the second base station.

In an embodiment of the present invention, when the power determining device is the control node, the second processor 403 is specifically configured to receive the capacity information of the second cell sent by the second base station. When the power determining device is the second base station, the second processor 403 is specifically configured to calculate the capacity information of the second cell according to the transmission power preset by the second base station on the specific resource of the second cell and measurement information reported by a user equipment served by the second cell.

Figure 6:
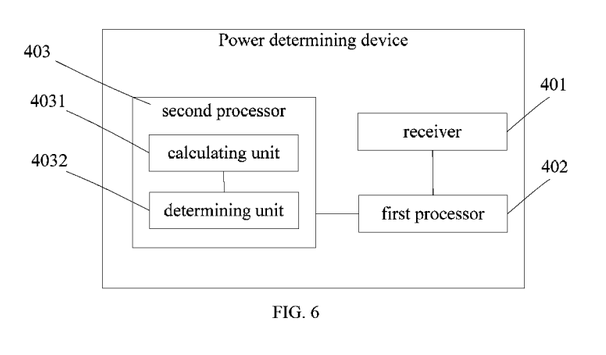
FIG. 6 is an apparatus schematic block diagram illustrating a power determining device as provided by a specific embodiment of the present invention.

Referring to FIG. 6, in an embodiment of the present invention, the second processor 403 as shown in FIG. 5 includes: a calculating unit 4031, which is configured to calculate total capacity information of the first cell and the second cell according to the capacity information of the first cell and the capacity information of the second cell when there are a plurality of transmission powers preset by the second base station on the specific resource of the second cell, then there are a plurality of pieces of capacity information of the first cell corresponding to the transmission powers preset by the second base station on the specific resource of the second cell, and there are a plurality of pieces of capacity information of the second cell which correspond to the transmission powers preset by the second base station on the specific resource of the second cell, wherein there are a plurality of pieces of total capacity information which correspond to the transmission powers preset by the second base station on the specific resource of the second cell.

In the embodiment depicted in FIG. 6, the second processor 403 also includes a determining unit 4032, which is configured to select the maximum total capacity information from the plurality of pieces of total capacity information calculated, and take the power corresponding to the maximum total capacity information as the transmission power used by the second base station on the specific resource of the second cell.

With the above-mentioned technical solution provided in an embodiment of the present invention, by the implementation of the technical solution of receiving the capacity information of the first cell sent by the first base station, obtaining the capacity information of the second cell, and then determining the transmission power used by the second base station on the specific resource of the second cell according to the capacity information of the first cell and the capacity information of the second cell, the maximization of the total capacity of the first cell and the second cell can be guaranteed.

Figure 7:
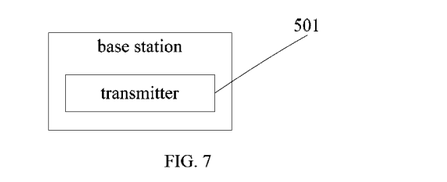
FIG. 7 is an apparatus schematic block diagram illustrating a base station as provided by a specific embodiment of the present invention.

Still another aspect of an embodiment of the present invention provides a base station. Referring to FIG. 7, the base station may specifically be the first base station in the above-mentioned method embodiments, and may include: a transmitter 501, which is configured to send capacity information of a first cell to a serving base station of a second cell, wherein the capacity information of the first cell corresponds to a transmission power preset by the serving base station of the second cell on a specific resource of the second cell, the specific resource is a radio resource shared by the first cell and the second cell, and the first capacity information is used by the serving base station of the second cell to determine the transmission power used on the specific resource of the second cell.

As an optional embodiment, the capacity information of the first cell is included in load information sent to the serving base station of the second cell by the serving base station of the first cell.

Figure 8:
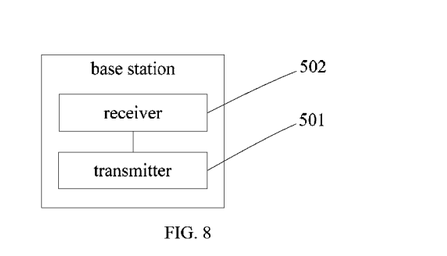
FIG. 8 is an apparatus schematic block diagram illustrating a base station as provided by a specific embodiment of the present invention.

Referring to FIG. 8, as another optional embodiment, the base station shown in FIG. 7 can further include a receiver 502, which is configured to receive capacity request information sent by the serving base station of the second cell.

Accordingly, the transmitter 501 is specifically configured to send the capacity information of the first cell to the serving base station of the second cell according to the capacity request information.

Optionally, the capacity request information is included in a resource status request message sent to the serving base station of the first cell by the serving base station of the second cell, and the capacity information of the first cell is included in a resource status update message sent to the serving base station of the second cell by the serving base station of the first cell.

Furthermore, in the above-mentioned embodiment, the base station may be configured to calculate the capacity information of the first cell according to the transmission power preset by the second base station on the specific resource of the second cell and measurement information of the first cell and a neighboring cell reported by a user equipment. With the technical solution provided in the above-mentioned embodiment, the first base station sends the capacity information of the first cell to the second base station such that the second base station may determine the transmission power used on the specific resource of the second cell according to the capacity information of the first cell, and thus the capacity of the first cell can be guaranteed.

Figure 9:
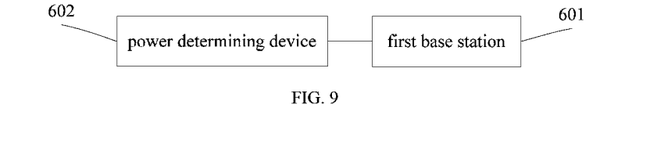
FIG. 9 is a schematic diagram illustrating a system for determining a transmission power as provided by a specific embodiment of the present invention.

In addition, an embodiment of the present invention still provides a system for determining a transmission power. Referring to FIG. 9, the system includes: a first base station 601 and a power determining device 602.

The above first base station 601 is configured to send capacity information of a first cell to the power determining device 602, the capacity information of the first cell corresponds to a transmission power preset by a second base station on a specific resource of the second cell, and the specific resource is a radio resource shared by the first cell and the second cell; the above power determining device 602 is configured to receive the capacity information of the first cell sent by the first base station, and then determine the transmission power used by the second base station on the specific resource of the second cell according to the capacity information of the first cell.

With the above-mentioned technical solution provided in the present invention, the power determining device receives the capacity information of the first cell sent by the serving base station of the first cell, and determines the transmission power used by the serving base station of the second cell on the specific resource of the second cell according to the capacity information of the first cell, thus the capacity of the first cell (i.e. victim cell) can be guaranteed.

As an optional embodiment, the power determining device 602 is further configured to obtain capacity information of the second cell, wherein the capacity information of the second cell corresponds to the transmission power preset by the serving base station of the second cell on the specific resource of the second cell, and then determine the transmission power used by the serving base station of the second cell on the specific resource of the second cell according to the capacity information of the first cell and the capacity information of the second cell, to guarantee the maximization of total capacity of the first cell and the second cell.

In an embodiment of the present invention, the power determining device 602 is specifically the second base station or the control node as described in the above-mentioned method embodiments, and the detailed structure thereof may refer to the power determining device shown in FIG. 4, 5, or 6, and the detailed structure of the first base station 601 may refer to the base station shown in FIG. 7 and FIG. 8, and thus will not be described redundantly herein.

The interaction between the devices as described in the embodiments of the present invention, may refer to the description in the above-mentioned method embodiments, and thus will not be described redundantly herein.

It should be appreciated for those skilled in the art that all or a part of the steps in the above-mentioned embodiments may be implemented by hardware, or may be implemented by program instructing relevant hardware. The program may be stored in a computer readable storage medium, and the abovementioned storage medium may be a read-only memory, a magnetic disk, an optical disk, or the like.

The preceding embodiments are merely preferred embodiments of the present invention, rather than limiting the present invention. All the modification, equivalent substitution, or improvement made within the principle of the present invention should fall within the protection scope of the present invention.

What is claimed is:

1. A method for determining a transmission power, comprising:
receiving, by a power determining device from a serving base station of a first cell, capacity information of the first cell, the capacity information corresponding to a transmission power preset by a serving base station of a second cell on a specific resource of the second cell, wherein the specific resource of the second cell is a radio resource shared by the first cell and the second cell; and
determining, by the power determining device, a transmission power used by the serving base station of the second cell on the specific resource of the second cell according to the capacity information of the first cell, wherein determining, by the power determining device, a transmission power used by the serving base station of the second cell on the specific resource of the second cell according to the capacity information of the first cell, comprises:
calculating, by the power determining device, an average capacity of the first cell according to the capacity information of the first cell, and determining the transmission power used by the serving base station of the second cell on the specific resource of the second cell according to the average capacity of the first cell.

2. The method of claim 1, wherein determining the transmission power used by the serving base station of the second cell on the specific resource of the second cell according to the average capacity of the first cell, comprises:
determining, by the power determining device, the maximum transmission power from a plurality of transmission powers at which the average capacity of the first cell satisfies a predetermined capacity threshold, and
taking the maximum transmission power as the transmission power used by the serving base station of the second cell on the specific resource of the second cell.

3. The method of claim 1, wherein there are a plurality of transmission powers preset by the serving base station of the second cell on the specific resource of the second cell, and
wherein there are a plurality of pieces of capacity information of the first cell, each of which has a one-to-one correspondence with a transmission power of the plurality of transmission powers preset by the serving base station of the second cell on the specific resource of the second cell.

4. The method of claim 1, wherein the power determining device is a control node.

5. The method of claim 1, wherein the power determining device is the serving base station of the second cell.

6. A power determining device, comprising:
a receiver configured to receive, from a serving base station of the first cell, capacity information of the first cell that corresponds to a transmission power preset by a serving base station of a second cell on a specific resource of the second cell, wherein the specific resource of the second cell is a radio resource shared by the first cell and the second cell; and
a first processor configured to calculate an average capacity of the first cell according to the capacity information of the first cell, and determine the transmission power used by the serving base station of the second cell on the specific resource of the second cell according to the average capacity of the first cell.

7. The device of claim 6, wherein the first processor is configured to:
determine, for the power determining device, the maximum transmission power at which the average capacity of the first cell satisfies a predetermined capacity threshold, and
take the maximum transmission power as the transmission power used by the serving base station of the second cell on the specific resource of the second cell.

8. The device of claim 6, there are a plurality of transmission powers preset by the serving base station of the second cell on the specific resource of the second cell, and there are a plurality of pieces of capacity information of the first cell, each of which has a one-to-one correspondence with one of the plurality of transmission powers preset by the serving base station of the second cell on the specific resource of the second cell.

9. The device of claim 6, wherein the power determining device is a control node.

10. The device of claim 6, wherein the power determining device is the serving base station of the second cell.

11. A method for determining a transmission power, comprising:
receiving, by a power determining device from a serving base station of a first cell, capacity information of the first cell, the capacity information corresponding to a transmission power preset by a serving base station of a second cell on a specific resource of the second cell, wherein the specific resource of the second cell is a radio resource shared by the first cell and the second cell;
determining, by the power determining device, a transmission power used by the serving base station of the second cell on the specific resource of the second cell according to the capacity information of the first cell; and
obtaining, by the power determining device, capacity information of the second cell, wherein the capacity information of the second cell corresponds to the transmission power preset by the serving base station of the second cell on the specific resource of the second cell, and
wherein determining, by the power determining device, transmission power used by the serving base station of the second cell on the specific resource of the second cell according to the capacity information of the first cell, comprises:
determining, by the power determining device, the transmission power used by the serving base station of the second cell on the specific resource of the second cell according to the capacity information of the first cell and the capacity information of the second cell.

12. The method of claim 11, wherein there are a plurality of transmission powers preset by the serving base station of the second cell on the specific resource of the second cell,
wherein there are a plurality of pieces of capacity information of the first cell, each of which has a one-to-one correspondence with a transmission power of the plurality of transmission powers preset by the serving base station of the second cell on the specific resource of the second cell, and there are a plurality of pieces of capacity information of the second cell which have a one-to-one correspondence with the transmission powers preset by the serving base station of the second cell on the specific resource of the second cell, and wherein determining the transmission power used by the serving base station of the second cell on the specific resource of the second cell according to the capacity information of the first cell and the capacity information of the second cell comprises:

calculating total capacity information of the first cell and the second cell according to the capacity information of the first cell and the capacity information of the second cell, wherein there are a plurality of pieces of total capacity information, each of which has a one-to-one correspondence with a transmission power of the plurality of transmission powers preset by the serving base station of the second cell on the specific resource of the second cell; and selecting the maximum total capacity information from the plurality of pieces of total capacity information calculated, and taking a power corresponding to the maximum total capacity information as the transmission power used by the serving base station of the second cell on the specific resource of the second cell.

\* \* \* \* \*